United States Patent [19]

Johnson et al.

[11] Patent Number: 4,637,511
[45] Date of Patent: Jan. 20, 1987

[54] LONGER LASTING WOVEN POLYARAMIDE BELTING FOR HIGH TEMPERATURE APPLICATIONS

[75] Inventors: Charles E. Johnson, East Aurora; Richard W. New, Tonawanda, both of N.Y.

[73] Assignee: Buffalo Weaving and Belting Company, Buffalo, N.Y.

[21] Appl. No.: 680,905

[22] Filed: Dec. 12, 1984

Related U.S. Application Data

[63] Continuation-in-part of Ser. No. 340,845, Jan. 30, 1982, abandoned.

[51] Int. Cl.⁴ .............................................. B65G 15/30
[52] U.S. Cl. ................................ 198/846; 139/425 R; 474/270
[58] Field of Search ..................... 139/425 A, 425 R; 198/847, 846; 474/261, 267, 270, 272

[56] References Cited

U.S. PATENT DOCUMENTS

| 308,044 | 11/1884 | Teter | 474/270 X |
| 2,270,154 | 1/1942 | Whittier | 198/846 X |
| 2,898,663 | 8/1959 | Kitahara | 139/425 R |
| 2,955,969 | 10/1960 | Runton | 139/425 R |
| 3,077,947 | 2/1963 | Peebles et al. | 139/425 R |
| 3,177,904 | 4/1965 | Siverson | 198/846 X |
| 3,306,322 | 2/1967 | Willmann | 139/425 A |
| 3,683,712 | 8/1972 | Schiffli | 474/270 X |

FOREIGN PATENT DOCUMENTS 2004986  8/1971  Fed. Rep. of Germany ...... 198/847

Primary Examiner—Robert J. Spar
Assistant Examiner—Jonathan D. Holmes
Attorney, Agent, or Firm—Raymond F. Kramer

[57] ABSTRACT

Woven flexible belting of improved cut resistance, heat resistance and strength, and consequently, of longer life, so that it is suitable for use in a conveyer belt for carrying hot and sharp edged materials, includes warp and fill textile threads and yarns of Kevlar ® or equivalent polyaramide, having a plurality of separate thermally conductive binder wires extending longitudinally along the belting and with portions thereof projecting to slightly beyond a surface plane of the belting, which surface is that intended to carry materials to be supported by the belting, as when it is employed as a part of a conveyer.

11 Claims, 3 Drawing Figures

LONGER LASTING WOVEN POLYARAMIDE BELTING FOR HIGH TEMPERATURE APPLICATIONS

This application is a continuation-in-part of application Ser. No. 340,845, filed Jan. 30, 1982, now abandoned.

This invention relates to woven flexible belting of a textile material which is suitable for conveying hot and/or sharp edged materials. More particularly, the invention relates to such belting which includes a plurality of separate thermally conductive binder wires, such as metal wires, running the length of the belting, separated by a relatively small distance from each other across the width of the belting and having separate portions thereof projecting to slightly beyond a surface plane of the belting.

Conveyer belts of textile materials are known and conveyer belts of metal have long been employed for carrying abrasive and sharp edged materials, such as coal, rock, ores and metal scrap. Metal parts and wires have been incorporated in belting. Yet, prior to the present invention such wires have not been successfully incorporated in woven flexible belting to give it improved heat resistance, cut resistance and strength, in the manner described in this specification, and such belting containing metal wires has not previously been successfully and commercially manufactured, utilizing available machinery for manufacturing textile belting.

The closest prior art publications known to applicants, found primarily as a result of a search made in the files of the U.S. Patent and Trademark Office, principally in subclasses 74-237; 139-425 R; 198-844; -846; -847; -848; and 474-260; -261; -262; -263; and -270, are U.S. Pat. Nos. 308,044; 932,015; 2,864,409; 2,955,969; 3,306,322; 3,612,256; and 3,683,712. It is known from these patents and from others that metal parts of conveyer belts help to dissipate heat and resist cutting and abrasion. Metal conveyer belts are known to be stronger than textile belts, in the usual case, and better resist the effects of heat, sharp edged conveyed materials and abrasive materials. However, metal conveyer belts are expensive, are often impractical and do not have some of the significant advantages of the textile belts. Incorporation of metal threads in textile belts has apparently not heretofore been commercially feasible and in many cases when such threads are incorporated the resulting belt will not be satisfactorily heat resistant and cut resistant, or at least, will not be as satisfactory as conveyer belts made from the belting of this invention. For example, even a polyaramide belt containing metal wires, which was marketed in competition with the belt of the present invention, has been found to be of significantly shorter useful life when employed to convey hot items, such as newly molded large light bulbs and television picture tubes. The conveyer belts of this invention are useful for conveying objects at a temperature as high as 600° C. despite the fact that the polyaramide melts at about 480° C., and such conveyer belts, in such use, last about twice as long as other belting made of polymeric material, even when metal wires are incorporated in it, and they also last about twice as long as asbestos belts, the previous standard for high temperature conveyor belting uses. Also, the present conveyer belts are readily manufacturable from available raw materials by methods presently being employed in the industry to make high quality close woven textile belting, without increased complication of the manufacturing method or machinery, and without increased expense, except for the difference in costs of metal threads and the polyaramide threads employed, compared to normal textile binder threads and other normal textile materials.

In accordance with the present invention woven flexible belting of improved cut resistance, heat resistance and strength comprises warp and fill textile threads and yarns, with a plurality of separate thermally conductive binder wires distributed over the belting width, running longitudinally and projecting to about a surface plane of the belting. In a preferred form of the invention the thermally conductive binder wire has portions thereof projecting slightly beyond (up to one mm.) a surface plane of one major surface only of the belting and the binder wire passes through approximately one-half of the belting thickness. In such preferred form of the invention the belting is made of a polyaramide, with aluminum, stainless steel or brass binder wires.

The invention will be readily understood by reference to this specification and the accompanying drawing, in which.

Figure 1:
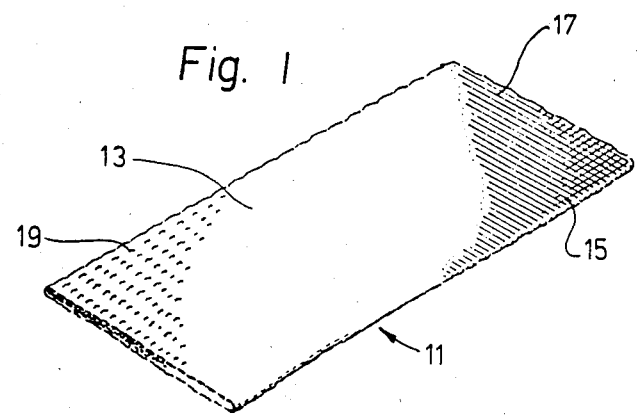
FIG. 1 is a top perspective view of a section of a length of belting (or a portion of a conveyer belt of the present invention) with a portion of the top surface thereof removed to show inner woven structure thereof.
Figure 2:
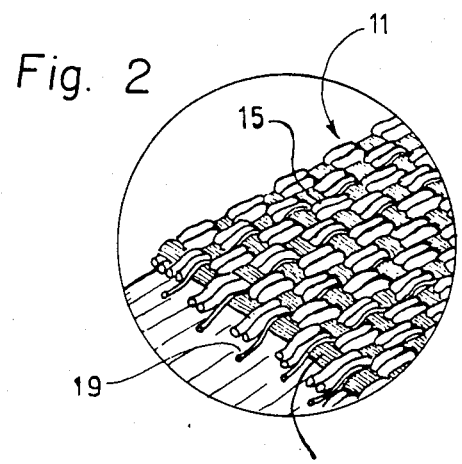
FIG. 2 is an enlarged view of a portion of the surface of the belting of FIG. 1.
Figure 3:
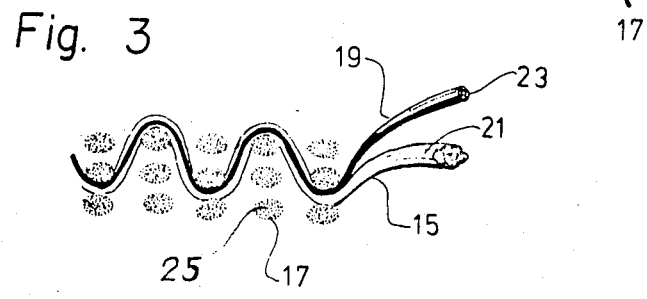
FIG. 3 is a further enlarged view in longitudinal section cutting through filler yarns, illustrating a relationship between the binder wire, warp threads and filler yarns.

In FIG. 1 tightly woven belting or conveyer belt portion 11 is shown generally, with details of parts thereof being better illustrated in the other figures. The normally upper or load bearing surface 13 of the belting includes warp threads 15 and filler yarns 17, shown on a part of the belting, and binder wires 19, which are of a thermally conductive material, very preferably of one or more of certain resilient metals, and which are very preferably composed of a plurality of wire filaments that are twisted or plied together. It will be noted that the binder wires are separated from each other, run longitudinally along the belting and project slightly beyond a surface plane of the upper belting face or side, which may be referred to as a major face or major surface. In FIG. 2 the weave is better illustrated and it is seen that a plurality of warp threads, each of which may include a plurality of individual threads, is located between each binder wire. From FIG. 2 it will also be seen that the filler yarn is composed of a multiplicity of parallel, untwisted filaments of textile material. In FIG. 3 such features are also better illustrated and additionally, it is apparent from the enlargement that the binder wire is a multi-filament wire. In FIG. 3 individual component threads 21 of warp thread 15, filaments 23 of wire 19, and filaments 25 of strand 17 are shown. Although in FIG. 3 binder wire 19 is shown woven with two layers of filler strands, and warp thread 21 is similarly illustrated, it is to be understood that the binder wire may bind more layers of strands and the warp thread may be and often is woven with a single layer of strands. Also, additional binder threads of textile material, which may also be considered to be represented by numeral 15, may be interspersed with the thermally conductive metal wires.

The textile materials employed to make a woven textile belting may be any of several such suitable materials for the particular application, such as polyamides, e.g., nylons, polyterephthalates, other polyesters, polyurethanes, and/or mixtures thereof (although mixtures are not preferred), but very preferably, for high temperature applications, will be a polyaramide (or aromatic polyamide), such as that sold under the trademark KEVLAR®, which is the condensation product of about equimolar proportions of terephthalic acid and 1,4-diaminobenzene. Such materials, while being fusible by heat, are not nearly as heat sensitive as polyethylene, for example. With respect to the heat conductive binder wires, these will preferably be of steel, stainless steel, copper, brass or aluminum, with aluminum and brass often being preferred. For best operation the metal filament or wire should be free of any core material and should be thin enough to be resilient so that it can be woven into the belting by being fed from spools to a weaving machine, just as a textile binder wire would be fed. Wires that are of materials which are non-resilient tend to distort the belting and can cause weaving machine mulfunctions.

The preferred warp textile is in the form of threads, preferably made from a plurality, e.g., 2 to 10, of plied threads, preferably 5 to 10, each of which basic threads may include from 10 to 200 or so filaments. Although plied threads are preferred, single threads may also be employed and in some cases an equivalent monofilament may be satisfactory. Nevertheless, it is preferred that the threads be multiple. The filler yarn is normally made of 10 to 200 filaments, each of which may be of a diameter in the range of 0.02 to 0.1 mm. Both the warp threads and the fill yarns will usually be of a thickness in the range of 0.5 to 1.5 mm.

Instead of fill yarns, warp threads may be employed but for making the best belting unplied yarns are preferred. Any binder warp threads employed will normally be of about the same characteristics as the other warp threads but sometimes thinner threads will be preferred, such as those of diameters about 25 to 75% of those of the warp threads. Filler pads or sheets, usually of unwoven material may be enclosed within the woven belting but normaly are not used. The binder wires are preferably plied wires comprising from about 5 to 15 filaments or so. Each of such filaments is of a diameter in the range of about 0.05 to 0.2 millimeter, with the thickness of the plied wire being in the range of about 0.1 to 1 mm. Although plied wires of this type are highly preferred it is within the scope of the invention in some circumstances to utilize monofilaments of about the same thickness as given for the plied wire, but often such wires will not be as desirably resilient or as readily utilizable in an automatic weaving machine without causing more frequent machine malfunctions and shutdown, and hence are not usually preferred.

The belting of this invention may be adjusted in thickness to suit the application but preferably is about 3 to 6 mm. thick and is of a tight weave, which is substantially form retaining, while still being flexible in longitudinal and transverse directions. The sides of the belting, as distinguished from the major faces thereof, are of closed design, created during the automatic weaving operations, so that no loose or cut threads or yarns are present. The binder wire projects slightly beyond a major surface of the belting, with about 5 to 20%, e.g., about 10% of the lengths of the binder wire being beyond such surface and with such surface portions of the binder wires being apart from the nearest other portions of such wires a distance of about 0.5 to 4 mm., e.g., 2 mm., for the same wire, measured along the belting surface. The binder wires will normally extend about 10 to 80%, e.g., halfway through the belting, so that they do not influence the surface structure of the "other" major surface of the belting. If such "influencing" is desired, one may weave binder wires in from both faces of the belting and in some cases one may also weave individual binder wires through to both faces of the belting. However, distinct advantages reside in having the binder wires project only to one major surface of the belting, leaving the other surface all-textile, and such will be discussed later herein.

The distances apart of the portions of the binder wire projecting to the major surface of the belting are of importance in providing locations for desirably absorbing heat from hot materials being supported by the belting to the desired extent, while resisting cutting or abrasion by sharp edged or abrasive materials on the belting, and strengthening the belting. The heat resistant characteristic is especially important when the belting is employed as part of a conveyer belt for hot materials, such as recently molded heavy glass items, e.g., TV tubes. Thus, it is important for the visible "ridges" of binder wire along the lengths thereof to be apart a distance in the range of 0.5 to 4 mm. and similarly it is important that the wires themselves be set apart a distance in the range of about 1.5 to 5 mm. It has been found that such distances result in better resistance to damage of the belting material when it is used on a conveyer for hot materials, and consequently, they are important for obtaining longer belting and belt life.

Various advantages of the present belting have already been mentioned but such will be briefly recounted here. The presence of the metal binder wire strengthens the belting, making it more resistant to stretching or distortion when subjected to sudden forces, as when heavy objects are dropped on the belting from substantial heights. Because the metal is not subject to expansions and contractions caused by changes in humidity, the wires tend to maintain better the dimensional stability of the belting. Yet, the wires are resilient and can yield in response to forces imposed, while returning to initial position shortly thereafter, thereby preventing breaking of the belting. Because of their strengths, which are greater than those for textile materials, the binder wires can hold the belting tightly together, improving even on the usual tight weave. The metal binder wires, projecting as they do to slightly beyond the surface plane of a major surface of the belting, have heat absorbing locations at such surface to draw heat away from the adjacent textile material when hot objects are placed on the belting or on the conveyer belt of which it is a part. There may be from four to twenty or so of such sites per square centimeter, with a normal number being about five to fifteen, e.g., eight. Because of the good thermal conductivity of the metal wires, especially those of copper, brass and aluminum, heat is quickly extracted from the location of the hot object on the belting, lowering the temperature at such location and protecting the thermoplastic textile material, while also helping to cool the object. Of course, even when the material of the belting is not thermoplastic and does not melt at the temperature of the conveyed objects, it may also be well protected by the present structure. Because of spacings apart of the metal binder wire "projections" they do not overheat due to excessive extractions of heat from conveyed objects and therefore the belting material is not melted or caused to fail.

The metal wire binder also serves to distribute any electrostatic charges, thereby helping to prevent buildup on the belting of dust and other materials which may be attracted to electrostatically charged material. This characteristic of the present belting is especially important when it is employed in conveyers, in which movement of the belting may tend to generate electrostatic charges, especially on some textile materials which tend to concentrate and maintain such charges. It is also important when such belting is employed for carrying items which must be kept free of dust and foreign objects, which otherwise could be transmitted to such items by a belt which tends to attract dust, etc.

Not the least of the important advantages of the Present belting is the protection by the wire binder of the textile material of the belting against being cut by sharp edged objects that are supported by the belting or by a conveyer belt of such belting material, and reducing the effects of abrasive materials on the belting. The metal binder wires tend to support such materials, allowing the textile to yield and avoid being cut or abraded. Yet, the belting structure avoids having the binder wire project more than a small distance above the surface plane of the belting and usually such projection, if any, will be less than 0.1 mm. (although for some designs projections up to 0.5 and 1 mm. can be tolerated). Thus, the belting presents a normal belting surface to material to be supported by it or brought into contact with it and the support for such material is over a continuous broad area, rather than only by metal projections extending substantially beyond the belting surface.

In one particularly useful application for the present belting material it is employed as a belt on a conveyer which receives heavy glass bulbs soon after they have been formed, when they are still hot. Such bulbs, at 600° C., are dropped onto the conveyer and are delivered by it to a subsequent work station while they are being cooled thereon, with the binder wires helping to remove some heat from the bulb at the same time that they protect the textile belt. Also, the heat removal is not so rapid as to cause strains in the glass. In this application the belt supports the force of the dropping bulk, without damage to the bulb or the belting. In other applications, hot molded or cast plastic or metal items may be conveyed by the belt, as may be sharp edged materials, such as rock, minerals, knife blades, etc. Such products, which can soon wear through an ordinary textile or asbestos conveyer, do not damage the present belting to nearly the same extent, and belting life is substantially increased (usually doubled) with attendant savings in down time and replacement costs for the conveyer.

One of the advantages of the present construction, wherein the binder wire projects to only one major surface of the belting is that the wire does not have to come into contact with drive and idler pulleys for the conveyor belt. Yet, if desired, such contact may be made, although better drive characteristics result when only the textile material touches the drive pulley surface. Of course, if desired, two sets of binder wires may be employed, one projecting to each the major surfaces of the belting, in which case it may be desirable to reverse the belting periodically to even out the wear on the textile and the metal binder wires.

Variations of the present belting may be made, among which is one wherein fill wires may also be employed, but genrally this is not considered to be necessary nor even desirable. The longitudinal wires tend to transfer heat a greater distance away from localized sites thereof and by avoiding fill wires one avoids any wear caused by metal to metal contacts. Yet, in some circumstances it may be desirable to utilize some transverse wires, which can be useful to help to extract heat froma relatively small area and move it along wires in both longitudinal and transverse directions, thereby sometimes improving the heat stability of the belting.

While the main use of the present belting is considered to be in making conveyer belts intended to handle hot, sharp or abrasive materials, the belting may be employed for other purposes, too. For example, it would appear that it might be useful in applications for belting or webbing material where greater strength and heat resistance are required than are available from ordinary textile belting. Among such applications may be aircraft catapults and arrestors, slings and straps. The binder wire may serve as a telltale, indicating when the adjacent textile materials are being worn, and the wire may prevent separation of the belt during operation of a conveyer when the textile is almost worn through. It is not intended that this list be considered to be complete with respect to the advantages and uses of the present belting and it is expected that other advantages and uses will be evident to those of skill in the art reading this specification.

The invention has been described with respect to illustrations and embodiments thereof but is not to be limited to these because it is clear that one of skill in the art, with the present specification before him, will be able to utilize substitutes and equivalents without departing from the invention.

What is claimed is:

1. Woven flexible belting, suitable for conversion to conveyor belting of increased cut resistance, heat resistance, and strength, and longer operating life, comprising warp and fill textile threads and yarns, which threads and yarns are of polyaramide condensation product of terephthalic acid and 1,4-diaminobenzene, and a plurality of unbraided and unfilled separate thermally conductive metal binder wires distributed over the belting width, running longitudinally and extending to a plane between a major surface of the belting and 1 mm. past such surface, with the binder wires each having 4 to 20 filaments therein, and being a distance apart in the range of 1.5 to 5 mm., with 5 to 20% of the lengths of such binder wires projecting to or beyond the major belting surface and with such wires extending about 10 to 80% throught the belting, so that they extend to or beyond one major surface of the belting, but not the other.

2. Belting according to claim 1 wherein the wire is a plied multifilament of a metal or metal alloy selected from the group consisting of steel, stainless steel, copper, brass and aluminum, the warp textile is a plied thread, and the fill textile is an unplied yarn.

3. Belting according to claim 2 wherein the binder wires pass through only one-half of the belting thickness.

4. Belting according to claim 3 wherein the binder wires include from 5 to 15 filaments, each of which is of a diameter in the range of 0.05 to 0.2 millimeter, with the thickness of the plied wire being in the range of 0.1 to 1 mm., the filaments and plied wire are resilient, the wires are apart a distance in the range of 1.5 to 5 mm., about 5 to 20% of the lengths of the binder wires is at a major surface of the belting, and the portions of the wire at the surface of a face of the belting extend beyond the surface up to 0.1 mm. past such surface and are apart a distance in the range of 0.5 to 4 mm. for the same wire, measured along the belting surface.

5. Belting according to claim 4 wherein the warp threads are multi-plied and are of a thickness in the range of 0.5 to 1.5 mm., and the fill yarns contain from 10 to 200 filaments of a thickness in the range of 0.02 to 0.1 mm.

6. Belting according to claim 5 which is from 3 to 6 mm. thick, has closed woven longitudinal sides and is of a tight weave, so that it is substantially form retaining, while still being flexible in longitudinal and transverse directions.

7. A conveyor belt, suitable for conveying hot and sharp edged materials, for supporting such materials and for absorbing shocks caused by their being dropped onto the conveyer belt, which belt is resistant to deterioration during such use and is of lengthened operating life, which comprises woven flexible belting of increased cut resistance, heat resistance and strength, comprising warp and fill textile threads and yarns, which threads and yarns are of polyaramide condensation product of terephthalic acid and 1,4-diaminobenzene, and a plurality of unbraided and unfilled separate thermally conductive metal binder wires distributed over the conveyer belt width, running longitudinally and extending to a plane between a major surface of the belt and 1 mm. past such surface, with the binder wires each having 4 to 20 filaments therein, and being a distance apart in the range of 1.5 to 5 mm., with 5 to 20% of the lengths of such binder wires projecting to or beyond the major belting surface and with such wires extending about 10 to 80% through the belting, so that they extend to or beyond one major surface of the conveyer belt, but not the other.

8. A conveyer belt according to claim 7, wherein the wire of the belting is of a metal or metal alloy selected from the group consisting of steel, stainless steel, copper, brass, and aluminum, the wrap textile of the belting is a plied thread, the fill textile is an unplied yarn and the binder wire is plied multifilament.

9. A conveyor belt according to claim 8 wherein the binder wires pass through only one-half of the belting thickness.

10. A belt according to claim 9 wherein the portions of wires at a major surface of the belt extend up to 0.5 mm. past such surface.

11. A belt according to claim 10 wherein the binder wires extend up to 0.1 mm beyond the surface of the belt.

* * * * *